(12) United States Patent
Newton

(10) Patent No.: US 7,327,102 B2
(45) Date of Patent: *Feb. 5, 2008

(54) PORTABLE FLUORESCENT TASK LAMP

(75) Inventor: James Newton, Arlington, TX (US)

(73) Assignee: Bayco Products, Ltd., Wylie, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/343,665

(22) Filed: Jan. 31, 2006

(65) Prior Publication Data

US 2006/0132047 A1 Jun. 22, 2006

Related U.S. Application Data

(63) Continuation of application No. 10/836,482, filed on Apr. 30, 2004, now Pat. No. 7,049,762.

(60) Provisional application No. 60/467,981, filed on May 5, 2003, provisional application No. 60/467,649, filed on May 2, 2003.

(51) Int. Cl.
*H05B 37/00* (2006.01)

(52) U.S. Cl. .............. 315/312; 315/320; 315/291; 315/224; 315/209 R

(58) Field of Classification Search ............ 315/312, 315/320, 324, 325, 323, 322, 291, 307, 209 R, 315/224

See application file for complete search history.

(56) References Cited

U.S. PATENT DOCUMENTS 6,236,168 B1 * 5/2001 Moisin .................. 315/291
7,164,237 B2 * 1/2007 Van Casteren .......... 315/209 R

* cited by examiner

*Primary Examiner*—Tuyet Vo
(74) *Attorney, Agent, or Firm*—Whitaker, Chalk, Swindle & Sawyer, LLP; Stephen S. Mosher

(57) ABSTRACT

A portable hand held fluorescent task lamp comprising at least two compact fluorescent lamp ("CFL") bulbs of any wattage and of either a non-starting type or a self-starting type; an electronic ballast circuit; and an SPST function switch disposed in series with each CFL bulb, wherein the CFL bulbs may be ignited and sustained in illumination in parallel, simultaneously or individually, as determined by the respective SPST switches.

22 Claims, 2 Drawing Sheets

PORTABLE FLUORESCENT TASK LAMP

CROSS REFERENCE TO RELATED APPLICATIONS

The present application is a Continuation of U.S. patent application Ser. No. 10/836,482 filed Apr. 30, 2004 now U.S. Pat. No. 7,049,762 and entitled "A PORTABLE FLUORESCENT LAMP," and claims priority from earlier filed U.S. Provisional Patent Applications: Ser. No. 60/467,649 filed May 2, 2003 and entitled "INTEGRATED CIRCUIT FOR TASK LIGHT," and Ser. No. 60/467,981 filed May 5, 2003 and entitled "ELECTRICAL CIRCUIT FOR A PORTABLE FLUORESCENT TASK LAMP."

BACKGROUND OF THE INVENTION

A. Field of the Invention

The present invention relates generally to the field of electrical lighting devices and, more specifically, to a portable fluorescent task lamp which features control of multiple compact fluorescent lamp ("CFL") bulbs of various types and light output ratings.

B. Description of the Prior Art

The prior art devices used for illumination in a work area have included battery powered flashlights that have a limited life and a narrow focus; incandescent drop-lights that feature electrically inefficient, very hot and volatile tungsten filaments; and also various types of fluorescent lights. Battery-powered flashlights typically offer less illumination than AC powered lights, and the batteries, even if rechargeable, are not operable continuously without recharging or replacing the batteries.

Portable, hand-held drop lights or task lights utilizing an incandescent bulb and powered by AC line current, typically 120 Volts AC, 60 Hz, allow the user to provide light where installed light fixtures do not provide adequate coverage. However, incandescent bulbs as the light source in task lamps have several disadvantages. Although incandescent light bulbs are a well-developed technology and are economical to purchase, they are not economical to operate. Much of the electrical energy used by the task light is converted to heat. The tungsten filament in a typical 100 Watt incandescent bulb causes the bulb to get too hot to touch in many common work area situations such as a task lamp being used by a technician to illuminate the engine compartment of an automobile. Moreover, the relatively fragile nature of the incandescent lamp with its glass bulb and its tungsten filament presents further drawbacks.

One alternative to the use of incandescent bulbs is the fluorescent bulb. Fluorescent bulbs convert more of the supplied electrical energy to light energy and operate at lower external temperatures than do incandescent lights. The light emitting medium in fluorescent lights is a phosphor coating, unlike the thin, fragile tungsten filament in an incandescent light bulb. In a fluorescent lamp bulb, a glass tube containing a small amount of gas—mercury vapor, for example—is provided with coated cathode electrodes at either end of the tube. When a high enough voltage is applied between each pair of electrodes at the ends of the glass tube, the coated filament is heated and emits electrons into the gas inside the tube. The gas becomes partially ionized and undergoes a phase change to a plasma state. The plasma is conductive and permits an electric arc to be established between the electrodes. As current flows in the plasma, electrons collide with gas molecules, boosting the electrons to a higher energy level. This higher energy level is not a stable condition and when the electron falls back to its normal energy level, a photon of ultra-violet light is emitted. The photons in turn collide with the phosphor coating on the inside of the glass tube, imparting their energy to the phosphor ions, causing them to glow in the visible spectrum. Thus the phosphor coating luminesces and gives off the characteristic "fluorescent" light.

Fluorescent bulbs, however, typically require a higher voltage to initiate the plasma state than is required to maintain the plasma state and the luminescence. Further, after becoming a plasma, the effective resistance of the plasma between the electrodes drops increasingly as the current increases. Unless the current is limited, the tube will draw excessive current and damage itself and/or the supply circuit. Typical practice to limit the current is to provide a damping circuit, called a "ballast," that operates to ignite the gas tube while also limiting the supply current. The ballast for full-sized installed light fixtures includes a large transformer/inductor, to transform the supplied line voltage, typically 120 Volts AC available at a wall outlet to a high enough potential to ignite the lamp and also to provide a high enough inductive impedance in the supply circuit to limit the current during operation. For typical installed lighting fixtures using non-self-starting bulbs and operating at 120 VAC, 60 Hz, the wire gauge, the number of turns in the coils, and size of the magnetic core result in a large and heavy ballast component. The ballast circuits for so-called "self-starting" fluorescent bulbs are typically smaller, yet still provide an appropriate voltage to ignite the lamps without a separate starter. The ballast circuit then regulates the current draw in a similar manner to that previously described for non-self starting bulbs.

Battery operated fluorescent lamps are well-known in the art but their use is usually limited to applications such as camp lighting or emergency lighting where a bright illumination is not essential. Battery operated fluorescent lamps typically cost more initially because they require an extra circuit to produce a high voltage, high frequency AC supply to operate the fluorescent bulb. Operation of the lamp at a higher frequency enables the use of smaller components which cost less and take up less space. Heretofore, a battery operated fluorescent task lamp, because of the additional circuit complexity, was relatively more expensive than a conventional AC line-operated task lamp. Such a ballast circuit thus can add complexity, cost, and an increased electrical load on the battery power supply if not carefully designed.

In one example of the prior art, U.S. Pat. No. 6,534,926, Miller et al., a portable fluorescent drop light is disclosed that contains a pair of twin-tube compact fluorescent lamp (CFL) bulbs that are individually switched. The discrete solid state drive circuit used as a ballast for non-self-starting bulbs utilizes the CFL bulbs as part of the oscillating circuit and has a relatively high component count. The circuit relies on several transformers, including separate windings for each CFL bulb, and a separate feedback protection circuit, to produce the drive voltage while limiting the current drawn by the bulbs during the run condition. Moreover, a different circuit is required for use with self-starting bulbs. Miller et al. thus has the disadvantages of relatively high component count, use of several transformers, and is not capable of driving non-self-starting or self-starting bulbs from the same ballast circuit. Further, since the lamps themselves are part of the oscillator circuits in Miller et al., the oscillator frequency is not independent of the variations in lamp characteristics unit-to-unit, and is thus subject to varying levels of performance.

A need exists, therefore, for an economical, portable hand-held task lamp that provides light output equivalent to that of a 100 Watt incandescent bulb, is efficient to operate, and does not operate at excessively high temperatures. A need also exists for a ballast circuit design which eliminates the need for a heavy transformer component and can preferably work with either self-starting or non-self-starting bulbs. The lamp should be sturdy and durable and replacement bulbs should be inexpensive, readily available, and easily changed. It would be a further desirable feature to provide variable illumination and as light-weight and compact a lamp as possible.

SUMMARY OF THE INVENTION

The present invention has as its object to overcome various of the shortcomings in the prior art described above. More specifically, it is an object of the present invention to provide a portable fluorescent task lamp having a ballast circuit design that is very efficient and operates with at least two "self-start" and "non-self start" type fluorescent bulbs of the type currently employed in task lamps of the drop light variety. The ballast circuit design will also preferably enable independent switching of twin or quad configuration, compact fluorescent light (CFL) bi-pin bulbs.

Accordingly there is disclosed a portable hand held fluorescent task lamp, comprising: an elongated housing molded of thermoplastic material and having a clear lens on a first side of a first end of the housing and a hand grip formed into the housing at a second end of the housing; a line cord; at least two compact fluorescent lamp ("CFL") bulbs removably disposed within the first end of the housing behind and visible through the clear lens, wherein each of the CFL bulbs may be rated at any wattage from approximately four Watts to approximately twenty four Watts and the CFL bulbs may be either a non-starting type or a self-starting type; a transformerless electrical drive circuit disposed within the elongated plastic housing, and connected at a first input to the line cord and connected at least first and second outputs to the at least two CFL bulbs, wherein the electrical drive circuit is powered by a 120 VAC or 240 VAC line voltage provided by the line cord connected to the first input; and an SPST switch connected in series with each CFL bulb, wherein each SPST switch includes an ON condition and an OFF condition; wherein the at least two CFL bulbs are ignited and sustained in illumination in parallel, simultaneously or individually as determined by the respective condition of each SPST switch.

Additional objects, features and advantages will be apparent in the written description and the accompanying drawings which follow.

DETAILED DESCRIPTION OF THE INVENTION

Figure 1:
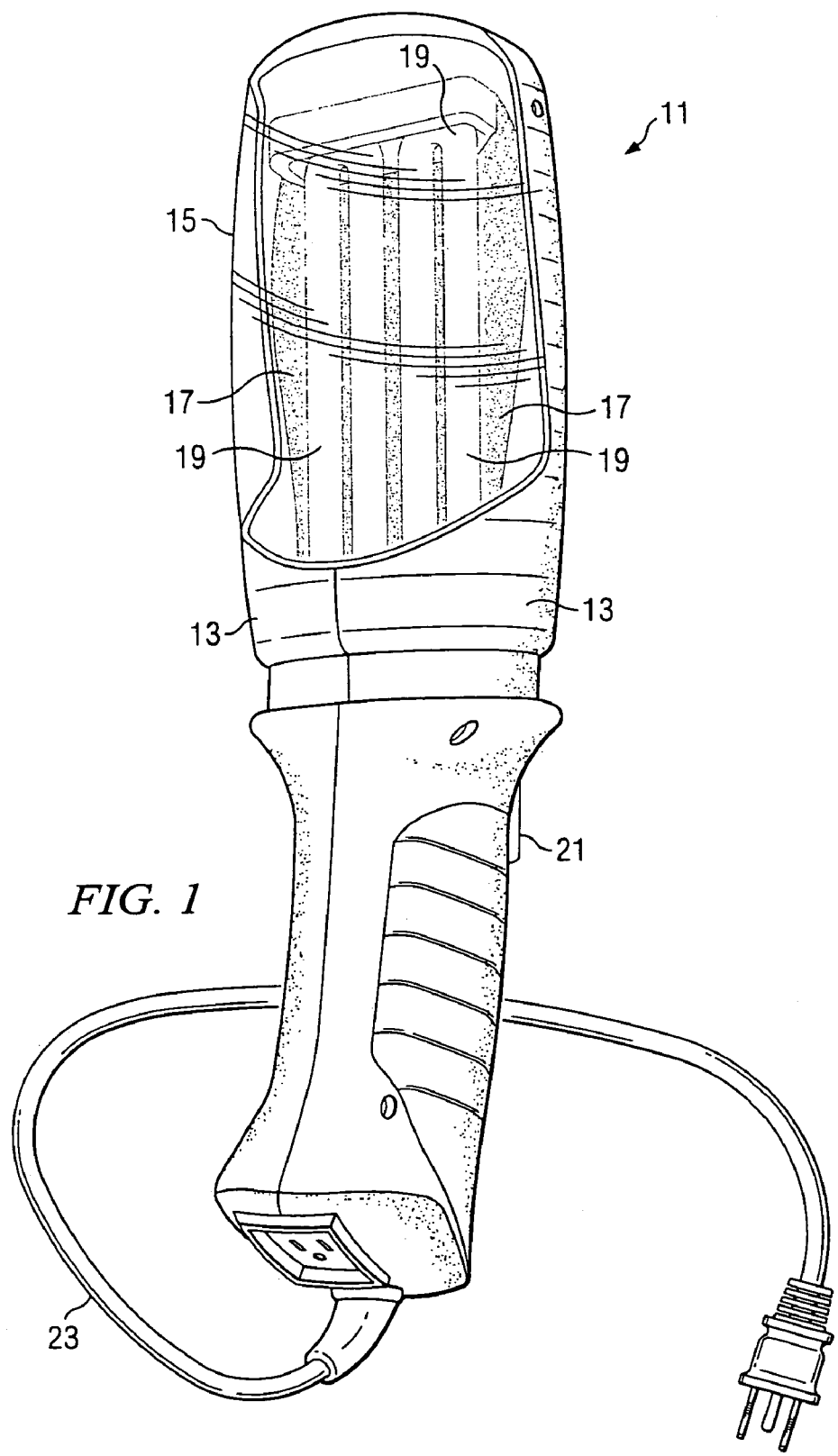
FIG. 1 is a pictorial view of a preferred embodiment of a portable fluorescent task lamp of the present invention.

Referring to FIG. 1, there is shown a two-bulb, portable fluorescent task lamp according to the present invention, designated generally as 11. The task lamp 11 includes an elongated housing configured as a two piece plastic housing 13 that may be molded of a thermoplastic material. A transparent portion of the housing is configured as a lens 15. The lens 15, which curves approximately half-way around the front half of the upper portion of the housing 13, is preferably fabricated of a suitable rugged and optically clear acrylic or polycarbonate material. The housing halves 13 may be configured to accommodate circuitry within a handle portion and a pair of twin-tube CFL bulbs 19 disposed within the housing 13 and enclosed behind the lens 15. A reflector 17 is also positioned within the housing 13 and behind the twin-tube CFL bulbs 19. The reflector 17 may be fabricated of a thin, aluminum coated, heat resistant material that can be formed into a curved shape to direct backward-emitted light from the twin-tube CFL bulbs 19 in a forward direction through the lens 15. Each of the twin-tube, bi-pin CFL bulbs 19 may be plugged into a corresponding receptacle (not shown) to facilitate connecting the bulbs 19 to the ballast circuit (see FIG. 2).

The portable task lamp 11 may also include end caps (not shown) and a hook (not shown) attached to one or both of the end caps, which allows the lamp to be conveniently suspended in a work area. In the example shown, the lamp 11 houses two twin-tube compact flourescent light (CFL) bi-pin bulbs 19, although other arrangements are possible. For example, present commercially available CFL bulbs are typically provided as either a twin-tube standard bulb or a quad-tube standard bulb. The twin-tube types have the advantage that they are less bulky, less expensive and more readily available. However, the twin-tube types are of approximately half the power (13W) and light output of the quad-tube lamps. While the quad-tube design offers approximately twice the power (27W) and illumination of a single twin-tube, the quad-tube bulb is typically more complex to produce. It is further more expensive and is not as readily available. In the illustrative embodiment of FIG. 1 and described herein, the pair of twin-tube CFL bulbs 19 (each being rated at approximately 13 Watts) provides the equivalent illumination of a 100 Watt incandescent bulb drop light.

Just visible in FIG. 1, near the upper portion of the handle portion of the housing 13 on the rear side, is a switch actuator 21. It is one of two rocker switches mounted side-by-side in the location described for operating each of the pair of twin-tube CFL bulbs 19 alone or in tandem as will be described herein below. The lamp may be powered by 120 Volts AC supplied through power cord 23. The lamp 11 is readily adaptable to other supply voltages such as 120 Volts AC, 50 Hz or 240 Volts AC, 50/60 Hz.

Figure 2:
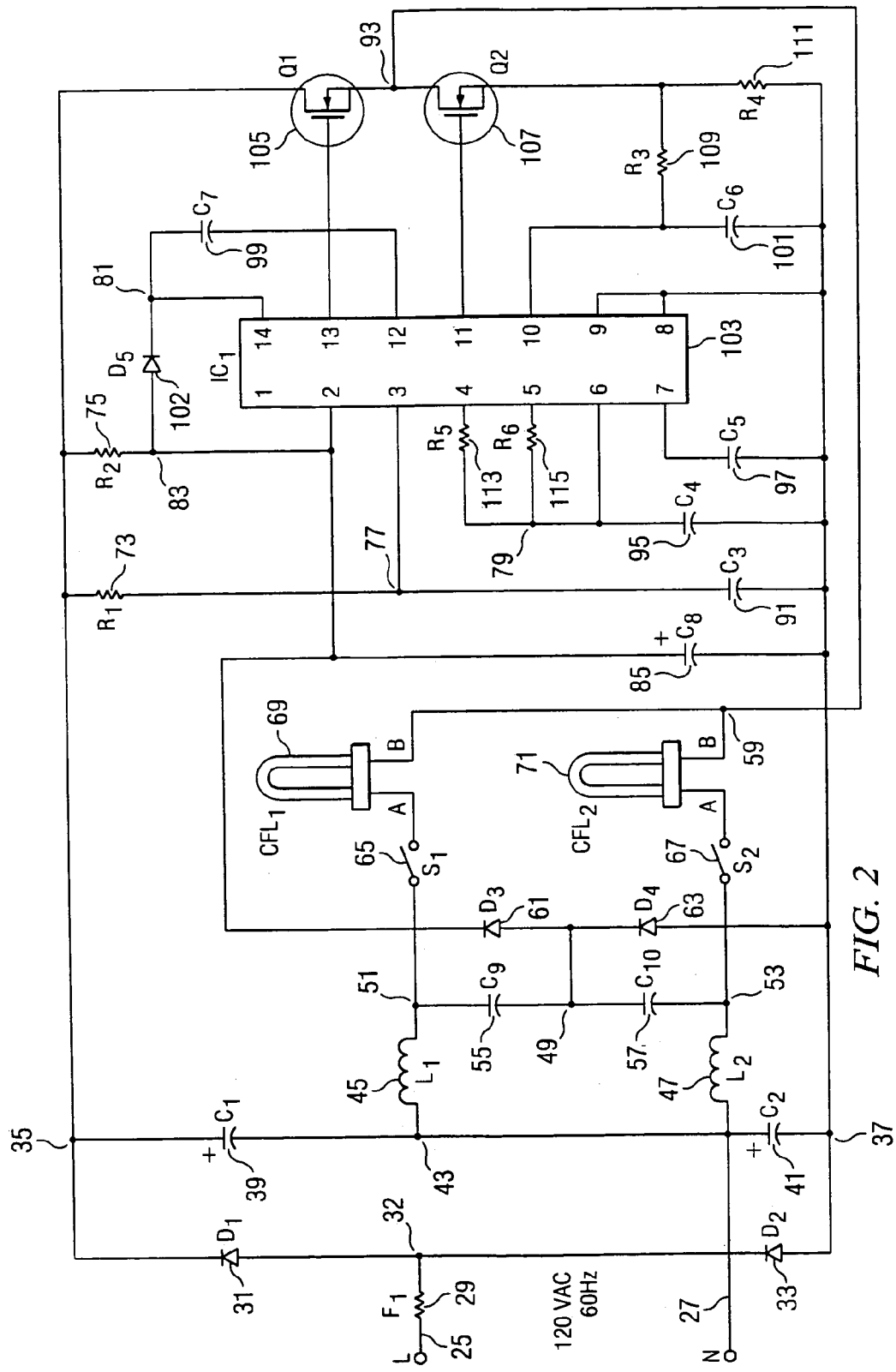
FIG. 2 is an electrical schematic of one embodiment of an electrical circuit used in the portable fluorescent task lamp of the present invention.

Referring to FIG. 2, there is illustrated a schematic diagram of one embodiment of a ballast or drive circuit for the two-bulb, portable fluorescent lamp 11 according to the present invention. The supply mains lines L and N, 25, 27 respectively, supply operating current to the circuit. The line L of the supply mains is coupled through a 15 Ohm, 1 Watt resistor that functions as a fuse F1 (29), to a node 32. The line N (27) of the supply mains is coupled to a node 43, which is the common return node of the power supply. Diodes D1 (31) and D2 (33) respectively, are connected in series between a positive supply node 35 and a negative supply node 37. The diode rectifiers 31 and 33 are joined at node 32. 22 uFd, 250 Volt DC Filter capacitors 39 and 41 are connected in series between the supply nodes 35 and 37. The filter capacitors are joined at the node 43. The foregoing components comprise a voltage doubler power supply for providing an operating voltage of approximately 270 Volts DC to the remaining circuitry to be described.

Continuing with FIG. 2, the twin-tube CFL lamp bulbs, CFL1 (69) and CFL2 (71) are connected in parallel lamp circuits between a supply node 59 and the common node 43. Each of the CFL bulbs 69, 71 include bipin terminals A and B. The CFL bulbs 69, 71 in the illustrated embodiment are each 13 watt compact fluorescent lamps, NEMA type CFT13/G23d. The circuit of FIG. 2 may be readily adapted to other ratings and styles of CFL bulbs. The B terminals of the CFL bulbs 69, 71 are connected to the supply node 59. Connected in series between the A terminal of the CFL1 bulb 69 and the common node 43 are a SPST switch 65, a node 51, and an inductor L1 (45). Connected in series between the A terminal of the CFL2 bulb 71 and the common node 43 are a SPST switch 67, a node 53, and an inductor L2 (47). The inductors L1 (45) and L2 (47) function as ballast chokes that limit the current that flows in each respective CFL bulb after the CFL bulb ignites. The inductors L1 (45) and L2 (47) are specially wound on EE25 cores that include a gap, and have an inductance of 3.3 mH. In addition, the inductance of the inductors L1 and L2 resonates with the internal capacitance (not shown) of the CFL bulbs, whether it is a non-self-starting or self-starting type of CFL bulb. The value of the inductance of L1 and L2 must also take into consideration the wattage rating of the CFL bulb being used. A pair of capacitors 55, 57, which are connected in series between nodes 51 and 53, are joined at a node 49. C9 (55) and C10 (57) in the illustrative embodiment are 330 pF, 1 KV ceramic capacitors. The anode of a diode rectifier D3 (61) and the cathode of a diode rectifier D4 (63) are also connected to the node 49. The cathode of the diode D3 (61) is connected to the positive supply voltage terminal pin 2 of IC1 (103) and the anode of the diode D4 (63) is connected to the voltage supply return terminal pin 8 of IC1 (103). Rectifier diodes D3 (61) and D4 (63) are type 1N4148 signal diodes. The pair of SPST switches 65, 67 are part of the switch actuator 21 described herein above in FIG. 1 and are used as ON/OFF switches to independently turn ON or OFF the CFL bulbs 69, 71.

Continuing with FIG. 2, the electrical drive circuit (an electronic ballast circuit) of the illustrated embodiment will now be described. The circuit of FIG. 2 is based on an integrated circuit IC1 (103) that develops output signals to drive a pair of MOSFET transistors Q1 (105) and Q2 (107) connected in series across the positive supply at node 35 and the negative supply at node 37. The IC1 in the illustrated embodiment, which provides the control portion of the electrical drive circuit, is a type IR2156 manufactured by International Rectifier, El Segundo, Calif. 90245 USA. The MOSFET transistors in the illustrated embodiment are type IRF720 from the same manufacturer. The type IRF720 is rated at 400 Volts, 3.3 Amperes and has an Rds ON of 1.8 Ohms. A resistor R1 (73) is connected between node 35 and a node 77. A capacitor C3 (91) is connected between the node 77 and the node 37. The node 77 is also connected to pin 3 of the IC1 (103). A resistor R2 (75) is connected between the node 35 and a node 83, which is also connected to pin 2, the Vcc supply voltage terminal of the IC1 (103). A capacitor C8 (85) is connected between the node 83 and the node 37. As previously described, the cathode of diode D3 (61) is also connected to the node 83 and the anode of the diode D4 (63) is connected to the node 37. As will be described further hereinbelow, the networks C9 (55) and D3 (61), and C10 (57) and D4 (63) are charge pump circuits for ensuring sufficient operating voltage for the IC1 (103) under certain conditions.

Continuing with FIG. 2, the anode of a diode D5 (102) is connected to the node 83 and the cathode of diode D5 (102) is connected to a node 81, which is connected to pin 14 of the IC1 (103). A capacitor C7 (99) is connected between a pin 12 of the IC1 (103) and the node 81 at pin 14 of the IC1 (103). Pins 8 (the Vss or return supply terminal) and 9 of the IC1 (103) are connected to the node 37. A capacitor C4 (95) is connected between pin 6 of the IC1 (103), which is also designated as a node 79, and the node 37. A resistor R5 (113) is connected between the node 79 and a pin 4 of the IC1 (103). R5 (113) is a timing resistor and C4 (95) is a timing capacitor. Together, R5 and C4 determine the run frequency of the oscillator in the IC1 (103). A resistor R6 (115) is also connected between the node 79 and a pin 5 of the IC1 (103). Capacitor C4 (95) and the resistors R5 (113) and R6 (115) set the timing values for the oscillator within the IC1 (103). R6 and R5, when connected in parallel by a transistor mode switch (not shown) within the IC1 (103), reduce the RC time constant for the oscillator to increase the oscillator frequency during the preheat mode, as will be described herein below.

A high side output drive signal from pin 13 of the IC1 (103) is coupled to a gate terminal of the transistor Q1 (105). A low side output drive signal from pin 11 of the IC1 (103) is coupled to a gate terminal of the transistor Q2 (107). The gate terminals of the transistors Q1 (105) and Q2 (107) are driven out of phase with respect to each other by the pulse waveform of the drive signals from the IC1 (103). The repetition rate of the drive signals, as set by the RC time constants (see the previous description for R5 and R6 and C4), may be in the range of approximately 30 KHz to 50 KHz in a typical application. The operating frequencies are also influenced by the characteristics of the particular CFL bulbs used in the circuit. For example, fluorescent bulbs include an internal capacitance that controls the starting behavior of the bulb. The value of this capacitance may vary as to whether the bulb is a non-self-starting or self-starting type. Thus, this capacitance is among the frequency determining components of the circuits.

As mentioned previously, the transistors Q1 (105) and Q2 (107) are connected in series across the positive supply node 35 and the negative supply node 37 to form the output stage of the electronic ballast circuit illustrated in FIG. 2. The drain terminal of the transistor Q1 (105) is connected to the node 35 and the source terminal of the transistor Q2 (107) is connected to the node 37. The drain terminal of the transistor Q2 (107) and the source terminal of the transistor Q1 (105) are connected together at a common output node 93. The common output node 93 is connected to the node 59, which is connected to the B terminals of both CFL lamps 69, 71. Transistors Q1 (105) and Q2 (107) form a half-bridge MOSFET drive circuit that alternately drives both CFL bulbs 69, 71 with a high frequency AC voltage of approximately 120 Volts AC.

In operation, each twin-tube CFL bulb (69, 71) of the illustrated embodiment shown in FIG. 2 may be switched ON or OFF independently according to the condition of the SPST switches 65, 67. The inductors L1, L2 (45,47) set the operating power and current of the bulbs. Operating voltage for the IC1 (103) is provided to pin 2 of IC1 (103) by the network R2 (75), node 83 and C8 (85). Voltage to operate the high side driver circuit internal to the IC1 (103), is provided by a bootstrap network of D5 (102) connected to pin 14 of the IC1 (103) via node 81, and C7 (99) connected between pins 14 and 12 of the IC1 (103). The DC voltage available at node 35 is measured by IC1 (103) at pin 3 via the network R1 (73) and C3 (91) coupled to the node 77. The networks C9 (55) and D3 (61), and C10 (57) and D4 (63) are charge pump circuits for ensuring sufficient operating voltage for the IC1 (103) when the second one of the two CFL lamps 69, 71 is to be ignited. This condition occurs, for example, when both of the switches 65, 67 are in an ON condition, or one of the switches 65, 67 is switched ON after the other of the switches 65, 67. The charge pump networks also function to reset the sweep signal generated within the IC1 (103) that controls the preheat segment of the ignition sequence for the CFL bulbs 69, 71. This sweep signal is adaptive in the sense that its timing automatically adapts to the type of CFL bulb in the circuit, i.e., whether the bulbs are non-self-starting or self-starting types.

Continuing with the operation of FIG. 2, the drive signals to the MOSFET transistors proceed sequentially through three modes after a first one of the switches 65, 67 is turned ON. The first mode is a preheat mode—about $\frac{9}{10}$ths of a second—to warm up the filaments in the CFL bulb(s) as set by the preheat resistor R6 (115) and the preheat capacitor C5 (97). The oscillator in IC1 (103) runs at a frequency determined by the time constant of R5 and R6 (in parallel) and C4. When the voltage across the preheat capacitor C5 (97) ramps upward to and reaches a first predetermined voltage (starting from zero volts), the transistor mode switch (not shown) within IC1 (103) disconnects the preheat resistor R6 and causes the oscillator frequency to ramp downward toward the run frequency determined by the R5, C4 time constant. As the oscillator frequency ramps downward, the AC output voltage produced at the common output node 93 ramps upward to ignite the bulb(s). When the voltage across the preheat capacitor C5 (97) continues past the first predetermined voltage and reaches a second, higher predetermined voltage, the downward change of the oscillator frequency is halted, the CFL bulb(s) ignites because of the higher voltage impressed across the bulb(s), and the oscillator begins to operate at the run frequency set by the RC time constant of R5 and C4. The brief period during which the oscillator frequency ramps downward toward the run frequency is called the ignition ramp mode of operation. After the bulb(s) ignite, the circuit enters the run mode wherein the output voltage at common output node 93 stabilizes at approximately the same level as during the preheat mode. This level is maintained by the voltage developed across the current sense resistor R4 (111), a 0.56 Ohm, 0.5 Watt resistor, and applied via the RC network of R3 (109) and C6 (101) to pin 10 of IC1 (103).

The foregoing is a summary of the operation of the electronic ballast circuit of FIG. 2. Further details of the operation of the integrated circuit IC1 (103) may be found in International Rectifier Data Sheet No. PD60182-I for the Ballast Control IC, type IR2156(S), which is incorporated herein by reference in its entirety. This ballast control integrated circuit is designed to drive a single, non-self-starting, compact fluorescent lamp (CFL) bulb. The wattage rating of the CFL bulb that is chosen may be accommodated by selecting appropriately rated MOSFET output transistors and adjusting other component values accordingly, as is well within the capability of persons skilled in the art. In the present invention, however, a way is demonstrated to drive two non-self-starting OR self-starting CFL bulbs, together or independently, using a single ballast control circuit. Although apparently simple, the modifications necessary to ensure firing of both bulbs, together or in sequence—by providing carefully selected ballast choke (inductors 45, 47) values, and a charge pump network for each CFL bulb 69, 71 that also participates in resetting the preheat sequence for the second bulb—is not previously known.

A number of advantages are readily apparent in the circuit design of FIG. 2. The use of the integrated circuit and half-bridge architecture in the circuit design of the invention minimizes the number and size of the induce devices, and allows a reduction in the overall number of required components and a consequent reduction in cost and circuit board space requirements. Further, the configuration provided by the present invention enables the same minimum-parts design to be used with a variety of twin-CFL bulb ratings simply by adjusting the values of several components that affect the current levels, frequencies and the timing sequence of the three modes of operation. In the illustrative example shown, two 13 watt CFL bulbs provide illumination that is approximately equivalent to a 100 watt incandescent bulb in a portable task light that uses much less energy and is much cooler in operation. An addition of two diodes (e.g., type IN7007) across a second line L2 to form a full-wave bridge rectifier (not shown, but readily understood by those skilled in the art) allows an easy conversion from the voltage doubler power supply to accommodate the 120 VAC or the full-wave bridge to accommodate the 240 VAC input power. Moreover, the circuit of FIG. 2 works with either non-self-starting or self-starting bulbs because of the characteristics of the ballast control IC and the particular selection of component values in the charge pump/current limiting networks for each of the CFL bulbs.

While the invention has been shown in only one of its forms, it is not thus limited but is susceptible to various changes and modifications without departing from the spirit thereof. For example, other Ballast Control integrated circuits designed for use with a single CFL bulb may be used in a circuit adapted for two or more CFL bulbs according to the principles of the present invention, i.e., providing for a charge pump circuit that operates independently with either bulb. The separate SPST switches may be replaced with other configurations, either manually operated switches or remotely-actuated electronic switches or automatic switches controlled by illumination levels, and the like, for the control of the individual lamp elements. The same circuit may be adapted to any of numerous configurations and Watt ratings, and light output requirements merely be selecting appropriate component values. In some configurations, for example, the CFL bulbs may be of mixed type and wattage ratings, requiring only the careful selection of component values in the lamp circuits such as the charge pump and current limiting networks. The power supply may be adapted to operate from any world-wide AC mains standard. Rechargeable versions of the portable fluorescent lamp disclosed herein may be provided by replacing the AC input power supply with a DC-operated inverter circuit and rectifier to provide the high voltage DC to operate the high frequency drive circuit.

What is claimed is:

1. A portable hand held fluorescent task lamp, comprising:
   at least first and second compact fluorescent lamp ("CFL") bulbs removably supported in an elongated housing;
   a transformerless electrical drive circuit disposed within the elongated housing, and connected at a first input to a common return node of a power supply connected to a line cord and connected via a common output node to the at least first and second CFL bulbs;
   a first series connection between the common return node and the common output node including a first current limiting inductor, a first node, a first single pole single throw (SPST) switch and the first CFL bulb; and
   a second series connection between the common return node and the common output node including a second current limiting inductor, a second node, a second SPST switch and the second CFL bulb;

wherein the at least first and second CFL bulbs are ignited and sustained in illumination in parallel as determined by a respective ON or OFF condition of each respective first and second SPST switches, independent of the starting characteristics of the first and the second CFL bulbs.

2. The apparatus of claim 1, wherein the transformerless electrical drive circuit includes a charge pump network for enabling the ignition and continuous illumination of each of the at least first and second CFL bulbs.

3. The apparatus of claim 2, wherein the charge pump network comprises:
first and second reverse biased diodes connected in series between a positive terminal and a negative terminal of a control portion of the electrical drive circuit, wherein a third node is defined at a junction between the first and second diodes;
a first coupling capacitor connected between the first node and the third node; and
a second coupling capacitor connected between the second node and the third node.

4. The apparatus of claim 1, wherein the elongated housing includes a reflecting panel disposed behind the at least first and second CFL bulbs disposed within the elongated housing.

5. The apparatus of claim 1, wherein the elongated housing includes an actuator switch assembly accessible on an external surface of the elongated housing proximate a hand grip portion;
wherein the actuator switch assembly includes the first and second SPST switches for controlling respectively each of the at least first and second CFL bulbs.

6. The apparatus of claim 1, wherein each of the at least first and second CFL bulbs are twin-tube compact fluorescent lamps having a wattage rating of approximately four to thirty watts.

7. The apparatus of claim 1, wherein the transformerless electrical drive circuit provides for preheat, ignition, and run modes of operation of the at least first and second CFL bulbs.

8. The apparatus of claim 1, wherein the transformerless electrical drive circuit further comprises:
a control circuit having a Vcc terminal connected to a positive supply voltage, a Vss terminal connected to the common return node and having preheat, ignition, and run modes of operation of the at least first and second CFL bulbs.

9. The apparatus of claim 1, wherein the transformerless electrical drive circuit is powered by a 120 VAC or 240 VAC line voltage provided by the line cord connected to the power supply.

10. An electrical drive circuit for a portable hand held fluorescent task lamp, comprising:
a transformerless circuit, connected to drive at least first and second compact fluorescent lamp ("CFL") bulbs, the transformerless circuit connected at a first input to a common return node of a power supply connected to a line cord and connected via a common output node to the at least first and second CFL bulbs;
a first series connection between the common return node and the common output node including a first current limiting inductor, a first node, a first single pole single throw (SPST) switch and the first CFL bulb; and
a second series connection between the common return node and the common output node including a second current limiting inductor, a second node, a second SPST switch and the second CFL bulb;
wherein the at least first and second CFL bulbs are ignited and sustained in illumination in parallel as determined by a respective ON or OFF condition of each respective first and second SPST switches, independent of the starting characteristics of the first and the second CFL bulbs.

11. The electrical drive circuit of claim 10, wherein the transformerless electrical drive circuit includes a charge pump network for enabling the ignition and continuous illumination of each of the at least first and second CFL bulbs.

12. The apparatus of claim 11, wherein the charge pump network comprises:
first and second reverse biased diodes connected in series between a positive terminal and a negative terminal of a control portion of the electrical drive circuit, wherein a third node is defined at a junction between the first and second diodes;
a first coupling capacitor connected between the first node and the third node; and
a second coupling capacitor connected between the second node and the third node.

13. The apparatus of claim 10, wherein each of the at least first and second CFL bulbs are twin-tube compact fluorescent lamps having a wattage rating of approximately four to thirty watts.

14. The apparatus of claim 10, wherein the transformerless electrical drive circuit provides for preheat, ignition, and run modes of operation of the at least first and second CFL bulbs.

15. The apparatus of claim 10, wherein the transformerless electrical drive circuit further comprises:
a control circuit having a Vcc terminal connected to a positive supply voltage, a Vss terminal connected to the common return node and having preheat, ignition, and run modes of operation of the at least first and second CFL bulbs.

16. The apparatus of claim 10, wherein the transformerless electrical drive circuit is powered by a 120 VAC or 240 VAC line voltage provided by the line cord connected to the power supply.

17. An electrical drive circuit for operating compact fluorescent ("CFL") bulbs, comprising:
a transformerless electrical drive circuit connected at a first input to a common return node of a power supply connected to a line cord and connected via a common output node to at least first and second CFL bulbs;
a first series connection between the common return node and the common output node including a first current limiting inductor, a first node, a first single pole single throw (SPST) switch and the first CFL bulb; and
a second series connection between the common return node and the common output node including a second current limiting inductor, a second node, a second SPST switch and the second CFL bulb;
wherein the at least first and second CFL bulbs are ignited and sustained in illumination in parallel as determined by a respective ON or OFF condition of each respective first and second SPST switches, independent of the starting characteristics of the first and the second CFL bulbs.

18. The apparatus of claim 17, wherein the transformerless electrical drive circuit includes a charge pump network for enabling the ignition and continuous illumination of each of the at least first and second CFL bulbs.

19. The apparatus of claim 18, wherein the charge pump network comprises:

first and second reverse biased diodes connected in series between a positive terminal and a negative terminal of a control portion of the electrical drive circuit, wherein a third node is defined at a junction between the first and second diodes;

a first coupling capacitor connected between the first node and the third node; and a second coupling capacitor connected between the second node and the third node.

20. The apparatus of claim 17, wherein each of the at least first and second CFL bulbs are twin-tube compact fluorescent lamps having a wattage rating of approximately four to thirty watts.

21. The apparatus of claim 17, wherein the transformerless electrical drive circuit provides for preheat, ignition, and run modes of operation of the at least first and second CFL bulbs.

22. The apparatus of claim 17, wherein the transformerless electrical drive circuit further comprises:

a control circuit having a Vcc terminal connected to a positive supply voltage, a Vss terminal connected to the common return node and having preheat, ignition, and run modes of operation of the at least first and second CFL bulbs.

* * * * *